(12) United States Patent
Schuh et al.

(10) Patent No.: US 10,618,837 B2
(45) Date of Patent: Apr. 14, 2020

(54) THIN GLASS COMPOSITE AND METHOD FOR STORING A THIN GLASS FILM

(71) Applicant: TESA SE, Norderstedt (DE)

(72) Inventors: Christian Schuh, Hamburg (DE); Klaus Keite-Telgenbüscher, Hamburg (DE); Tanita Czeski, Hamburg (DE)

(73) Assignee: TESA SE, Norderstedt (CH)

( * ) Notice: Subject to any disclaimer, the term of this patent is extended or adjusted under 35 U.S.C. 154(b) by 420 days.

(21) Appl. No.: 15/306,184

(22) PCT Filed: Apr. 9, 2015

(86) PCT No.: PCT/EP2015/057679
§ 371 (c)(1),
(2) Date: Oct. 24, 2016

(87) PCT Pub. No.: WO2015/162013
PCT Pub. Date: Oct. 29, 2015

(65) Prior Publication Data
US 2017/0044053 A1    Feb. 16, 2017

(30) Foreign Application Priority Data
Apr. 25, 2014    (DE) ......... 10 2014 207 792

(51) Int. Cl.
*B32B 15/04*      (2006.01)
*B32B 17/06*      (2006.01)
(Continued)

(52) U.S. Cl.
CPC .......... *C03C 17/28* (2013.01); *B32B 7/06* (2013.01); *B32B 17/064* (2013.01); *B65H 18/00* (2013.01);
(Continued)

(58) Field of Classification Search
USPC .................. 428/426, 428, 432, 688
See application file for complete search history.

(56) References Cited

U.S. PATENT DOCUMENTS

| 6,815,070 | B1 | 11/2004 | Buerkle et al. |
| 7,578,901 | B2 | 8/2009 | Muessig |

(Continued)

FOREIGN PATENT DOCUMENTS

| CN | 104093563 A | 10/2014 |
| DE | 1955853 A1 | 5/1971 |

(Continued)

OTHER PUBLICATIONS

International Search Report for corresponding application PCT/EP2015/057679 dated Jul. 17, 2015.
(Continued)

*Primary Examiner* — Lauren R Colgan
(74) *Attorney, Agent, or Firm* — Norris McLaughlin PA

(57) ABSTRACT

The invention relates to a rolled up thin glass composite comprising a thin glass film and at least one further layer (10, 11, 20, 30) applied over the surface of one side of the thin glass film, wherein the at least one further layer (10, 11, 20, 30) is applied to a radially outer side of the rolled up thin glass film and the at least one further layer (10, 11, 20, 30) contains a desiccant which protects the thin glass film against stress corrosion cracking. The invention also relates to a method for storing a thin glass film by providing a thin glass film, applying at least one further layer (10, 11, 20, 30) over the surface of at least one side of the thin glass film, wherein a desiccant which protects the thin glass film against stress corrosion cracking is added to the at least one further layer (10, 11, 20, 30) and a thin glass composite composed of the thin glass film and the at least one further layer (10, 11, 20, 30) is rolled up in such a way that the at least one further layer (10, 11, 20, 30) is applied to a radially outer side of the rolled up thin glass film.

16 Claims, 3 Drawing Sheets

Figure 1:
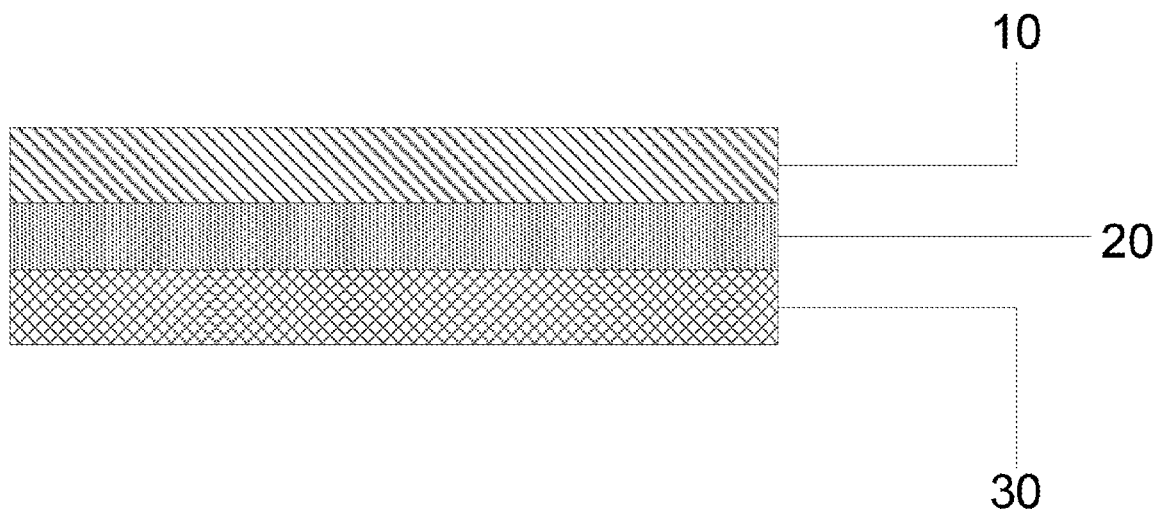

(51) Int. Cl.
  *C03C 17/28*   (2006.01)
  *B65H 18/28*   (2006.01)
  *B32B 7/06*   (2019.01)
  *C03C 17/00*   (2006.01)
  *B65H 18/00*   (2006.01)

(52) U.S. Cl.
  CPC ........... *B65H 18/28* (2013.01); *C03C 17/002* (2013.01); *B65H 2301/51145* (2013.01); *B65H 2701/1752* (2013.01)

(56) References Cited

U.S. PATENT DOCUMENTS

| | | | |
|---|---|---|---|
| 8,557,084 B2 | 10/2013 | Keite-Telgenbuescher et al. | |
| 9,543,549 B2 | 1/2017 | Bai et al. | |
| 2009/0026934 A1 | 1/2009 | Fujita et al. | |
| 2011/0036623 A1 | 2/2011 | Keite-Telgenbuescher et al. | |
| 2011/0200812 A1 | 8/2011 | Tomamoto et al. | |
| 2011/0217521 A1* | 9/2011 | Teranishi | B32B 3/02 428/189 |
| 2013/0196163 A1* | 8/2013 | Swanson | B32B 17/061 428/426 |
| 2015/0162568 A1 | 6/2015 | Bai et al. | |
| 2015/0224744 A1 | 8/2015 | Neuhaeusler et al. | |

FOREIGN PATENT DOCUMENTS

| | | |
|---|---|---|
| DE | 19742805 A1 | 4/1999 |
| DE | 10200131 A1 | 7/2003 |
| DE | 69919085 T2 | 7/2005 |
| DE | 102008037866 A1 | 2/2010 |
| DE | 102008047964 A1 | 3/2010 |
| DE | 102008061840 A1 | 6/2010 |
| DE | 102008062130 A1 | 6/2010 |
| DE | 102008060113 A1 | 7/2010 |
| DE | 102009036968 A1 | 2/2011 |
| DE | 102009036970 A1 | 2/2011 |
| DE | 102010043866 A1 | 5/2012 |
| DE | 102010043871 A1 | 5/2012 |
| DE | 102012211335 A1 | 1/2014 |
| DE | 102012215149 A1 | 3/2014 |
| EP | 0519278 A1 | 12/1992 |
| EP | 1469054 A1 | 10/2004 |
| EP | 1832558 A1 | 9/2007 |
| EP | 2204355 A1 | 7/2010 |
| EP | 2363383 A1 | 9/2011 |
| GB | 1319846 A | 6/1973 |
| JP | 2001097733 A | 4/2001 |
| JP | 2008273211 A | 11/2008 |
| JP | 2011168423 A | 9/2011 |
| WO | 0041978 A1 | 7/2000 |
| WO | 2005044560 A1 | 5/2005 |
| WO | 2005110741 A1 | 11/2005 |
| WO | 2008093153 A1 | 8/2008 |
| WO | 2011084323 A1 | 7/2011 |
| WO | 2012062586 A1 | 5/2012 |
| WO | 2012062587 A1 | 5/2012 |

OTHER PUBLICATIONS

English Translation of CN Office action in corresponding application CN 201580022145.4 dated Sep. 20, 2018.
English Translation of TW Office action in corresponding application TW 104111370 dated Oct. 16, 2018.
German Search Report for corresponding application DE 10 2014 207 792.3 dated Dec. 1, 2014.
H. Furuichi, et al., "Static fatigue and tensile fracture of glass fibres containing bubbles", Glass Technology vol. 35, No. 6, Dec. 1994, pp. 272-275.
M. Ciccotti, "Stress-Corrosion Mechanisms in Silicate Glasses", Journal of Physics D: Applied Physics, pp. 1-18, 2009, UK.
International Search Report or corresponding application PCT/EP2015/057679 dated Jul. 17, 2015.
E. P. Chang, "Viscoelastic Windows of Pressure-Sensitive Adhesives", Journal of Adhesion, 1991, vol. 34, pp. 189-200, USA.
M. Mizuhashi, et al., "Migration of Alkali Ions from Glass Substrates with and without Barrier Coating", Reports Res. Lab. Asahi Glass Co., Ltd., vol. 36, pp. 1-14, 1986.
H. K. Schmidt, "Modification of Glass Surfaces by Multifunctional Chemical Coatings", Fundamentals of Glass Science & Technology, pp. 21-32, 1995, Germany.
D. Satas, "Handbook of Pressure Sensitive Adhesive Technology", Satas & Associates, Third Edition, pp. 1-856, 1999.

* cited by examiner

THIN GLASS COMPOSITE AND METHOD FOR STORING A THIN GLASS FILM

This is an application filed under 35 USC 371 of PCT/EP2015/057679, filed on 9 Apr. 2015, which claims priority to DE 102014207792.3 filed 25 Apr. 2014. The applicant claims the full priority benefit available to these foregoing applications, and herein incorporates the entirety of these foregoing applications, as if fully set forth herein.

The invention relates to a thin glass composite which can be rolled up and which comprises a thin glass film and at least one further layer applied over the surface of at least one side of the thin glass film, and also to a method for storing a thin glass film.

Optoelectronic arrangements are being used more and more frequently in commercial products or are close to market introduction. Such arrangements comprise inorganic or organic electronic structures, examples being organic, organometallic or polymeric semiconductors or else combinations thereof. Depending on the desired application, the products in question are made rigid or flexible, there being an increase in demand for flexible arrangements. Arrangements of these kinds are frequently produced by printing methods such as relief printing, gravure printing, screen printing, planographic printing, or else "non impact" printing such as, for instance, thermal transfer printing, inkjet printing or digital printing. In many instances, however, vacuum methods are also used, such as Chemical Vapor Deposition (CVD), Physical Vapor Deposition (PVD), plasma-enhanced chemical or physical deposition (PECVD), sputtering, (plasma) etching or vapor coating, for example. Patterning is accomplished generally through masks.

Examples of optoelectronic applications that are already available commercially or are of potential market interest include electrophoretic or electrochromic systems or displays, organic or polymeric light-emitting diodes (OLEDs or PLEDs) in presentation and display devices or as lighting; furthermore, the thin glass films may serve to cover or encapsulate electroluminescent lamps, light-emitting electrochemical cells (LEECs), organic solar cells such as dye or polymer solar cells, inorganic thin-film solar cells, based for example on silicon, germanium-copper, indium or selenium, or perovskite solar cells or organic field-effect transistors, organic switching elements, organic optical amplifiers, organic laser diodes, organic or inorganic sensors, or organically or inorganically based RFID transponders.

The thin glass films are provided after having been rolled to form rolls. Because of the risk of stress corrosion cracking, and also for the purpose of mechanical stabilization, the thin glass film must be protected and stabilized with a protective film.

Essential for the broad deployment of thin glass on a roll are stability-maintaining measures for the purpose of avoiding glass corrosion. Glass corrosion is a phenomenon whose effect is to enlarge cracks in silicate glasses which are under tension. The corrosion under traction or inherent tension is also referred to as static fatigue or stress corrosion cracking. It results from the slow growth of the existing microcracks in the material.

In chemical terms, it is the interaction between the stressed molecules in the tip of the glass crack with the water molecules from the ambient air that is responsible for stress corrosion cracking.

Fused silicas, which consist of silicon oxides, have a high degree of homogeneity. The silicates are composed in tetrahedral units and are joined at their corners by silicon oxide bonds. On the atomic scale, the silicon oxide bonds carry the stresses in the material, and the breaking of the silicon oxide bonds is crucial and responsible for crack propagation within the material, referred to as stress corrosion cracking. At the tip of the crack in the fused silica, highly concentrated expansion fields are produced. Approximation values show that the bridging bonds, in other words the distance between the silicon atoms and oxygen atoms in the silicon oxide bond, undergo an extension of more than 20%. The effect of this extension on the bridging silicon oxide bond may be regarded as reduced bond overlap. The silicon and oxygen atoms in the extended bond therefore harbor an increased availability for bonding with other atoms. In particular this leads to an interaction of the stressed bridging bond at the tip of the crack with a molecule of water from the environment. The theory of stress corrosion cracking is also set out in the paper "Stress-corrosion mechanism in silicate glasses" (Matteo Ciccotti, Journal of Physics D: applied Physics Vol. 42, 2009).

In a first step, one molecule of water from the environment attaches to a stressed bridging Si—O—Si bond at the crack tip. The water molecule first attaches through the formation of a hydrogen bond between the H (of the water) and the O (oxygen from the Si—O—Si bond) and then, by interaction of the free electron pairs of the O (from the water) with the silicon, attaches to the silicon atom. The orbital interaction of the free electron pair may be based either on Van-der Waals attraction or on covalent bonding with unoccupied Si orbitals.

In a second step, a concerted reaction occurs. In this reaction, there is proton transfer to the SO (Si—O) simultaneously with electron transfer from the O (of the water) to the silicon. As a result of this reaction, two new bonds are formed, one between the O (of the water) and the silicon and one between H (of the water) and the O (of the Si—O).

In a third step, the bond between the O (of the water) and the transferred H (of the water) breaks, and Si—OH groups are formed on the surface. Since the hydrogen bonding is relatively weak, this step is anticipated immediately after the proton transfer. This is an ongoing reaction in the glass, occurring between the glass, which is under tension, and the ambient water. The mechanism also occurs, in a similar or identical form, in non-pure silicate glasses.

The thin glass films rolled up into rolls, in particular, are under stress which supports progressive cracking. There are various methods and devices known from the prior art which allow thin glass to be stabilized.

WO 2011/084323 A1 describes a polymer glass laminate for the stabilization of thin glass and for the sealing of microcracks. Microscopic structural defects are sealed here. An alkoxysilane-modified polyolefin seals the microcracks on contact with the glass. In the process, the microcrack is filled in, and the permeation rate at the sealed location amounts to at least 90% of the permeation rate of the undamaged material. A nonreversible bonding of the modified polyolefin to the glass is produced.

U.S. Pat. No. 6,815,070 B1 describes a glass/plastic composite for the stabilization of thin glass. The coating of the thin glass is accomplished by coating with liquid polymers. The application of the polymer layer is accomplished by spin coating, spraying, pouring on, roller application or dipping. The encapsulation of OLEDs is stated as a use. A disadvantage here is the costly and inconvenient process with liquid polymers.

WO 2005/110741 A1 describes various processes for producing glass/polymer laminates. Polymers are used in the form of films, melts, solutions, compositions. The polymers are applied by laminating, spraying, pouring, dipping, lining, and nozzle coating.

DE 19 55 853 A1 discloses a composite comprising a glass sheet with plastic coating on one or both sides. The objective is to provide a composite material which even under hot conditions has impermeability to gases and water vapor and also high flexibility. Production facilities are disclosed such as extrusion of the polymers or the lamination of sheets. In some cases the sheets have adhesive and adhesion promoter and are pressed together using heat. The composite serves for mechanical stabilization of the glass sheet.

EP 2 363 383 A1 discloses a laminate composed of thin glass and reinforcing interlayers of thermoplastic resin. The resins are bonded chemically to the glass via adhesion promoters. These are O—H-terminated polymers which are bonded to the glass via the epoxy groups of the adhesion promoter. The reinforcing capacity of the resin is therefore present directly on the glass and is not interrupted by soft PSA. The glass is coated on both sides with adhesion promoter and resin, producing a complex construction.

Known from JP 2008 273 211 was the reinforcement of a thin glass, preferably 10 to 70 μm, by means of polymer, preferably 10-200 μm, in some cases also with adhesion promoters or else with adhesive. Since glass, as its thickness falls, does become more flexible, but becomes more permeable to water and gas, the purpose of the resin coating on the thin glass is to re-establish a good barrier for protection of the encapsulated, preferably organic electronics. Here again, the polymer layer represents a mechanical stabilization of the thin glass.

DE 102 00 131 A1 describes flexurally elastic composites of glass with at least one polymer-reinforced side. Various multilayer constructions are disclosed, including a number of glass layers and polymer layers in a laminate. The layers are connected by adhesion promoters, which may also be pressure-sensitive adhesives or compounds having silane groups. A flexurally elastic composite is formed by lamination. Here again, only the mechanical stabilization of the glass by a film of polymer is described.

EP 2 204 355 A1 describes various processes for producing a thin glass with a polymer coating for stabilizing the thin glass. A variety of possible operations for the application of the polymer are disclosed. Coating takes place directly after glass manufacture or during glass manufacture, in order to prevent damage to the thin glass from the outset. The polymer layer stabilizes the thin glass. Here again, only mechanical stabilization of the film of polymer is described.

Lastly, in WO 2008/093153 A1, various methods for producing thin glass are described. The intention thereby is to enable the production of very wide areas of glass. A glass melt in billet form is blown, causing the glass to stretch, and the resulting parison is cut to form a ribbon. The ribbon is stretched by means of rollers. There is also an inline coating with polymer, comprising polyamide and acrylamide. On the one hand, the coating of the glass strand before inflation is disclosed, with the polymer then being included in the inflation procedure, and on the other hand a coating of the resultant thin glass shell is disclosed. The glass parison runs through a coating ring and is coated with liquid polymer with a thickness of 10 to 150 μm. The protective polymer layer is intended to protect the glass during service, especially during cutting.

In the prior art, therefore, there are indeed a variety of methods known for the coating of thin glass, allowing a thin glass film to be stabilized mechanically. However, the problem continues to exist of the self-propagating microcracking under tension.

It is therefore an object of the present invention to provide a thin glass composite which allows relatively long storage times under tension, especially in the rolled state, and also a method for storing a thin glass film.

The object is achieved in a first aspect by a thin glass composite as specified at the outset, having the features of claim 1, and in its second aspect by a method as stated at the outset, having the features of claim 12.

First of all, a film means a structure in sheet form whose dimensions in one spatial direction, namely thickness or height, are significantly smaller than in the two other spatial directions which defined the principal extent, namely length and width. The film may be of simple coherent or else perforated form. It may consist of a single material or of regionally different materials. The film may have a constant thickness or else different thicknesses over its whole superficial extent. The film may consist of a single layer or of a plurality of layers, which may be congruent or at least partly noncongruent in their arrangement.

A thin glass film refers to a film having a thickness of 15 to 200 μm, preferably 20 to 100 μm, preferably 25 to 75 μm, and more preferably 30 to 50 μm.

Advantageously the thin glass film is a borosilicate glass, as for example D 263 T ECO from Schott, an alkali metal silicate glass, or an aluminum borosilicate glass, such as AF 32 ECO, likewise from Schott.

Advantageously, the UV transmission of alkali metal-free thin glasses, such as the AF 32 ECO, for example, is higher than for alkali metal-containing thin glasses. For UV-curing adhesive agents, therefore, it is possible for initiators having absorption maxima in the UC-C region to be used more effectively, thereby raising the daylight stability of the noncrosslinked adhesive agent.

Thin glasses containing alkali metal such as D 263 T ECO have a relatively high coefficient of thermal expansion and therefore fit with possibly polymeric constituents of the adhesive agent layer or carrier material layer or of an optoelectronic arrangement on which the thin glass composite of the invention is applied and whose components are encapsulated by the thin glass composite.

The thin glasses may be produced in the down-draw process, as disclosed for example in WO 00/41978 A1, or in processes of the kind disclosed for example in EP 1 832 558 A1.

Thin glass films or thin glass composites are made available preferably as rolled up ribbons. Thin glass films of this kind are available under the designation Willow® glasses from Corning. The thin glass films can advantageously be laminated with adhesives provided in tape form, for the purpose of encapsulating electronic systems, for example, as described in DE 10 2008 062 130 A1, DE 10 2008 047 964 A1, DE 10 2008 037 866 A1 and DE 10 2008 060 113 A1, and also DE 10 2010 043 866 A1, DE 10 2010 043 871 A1, DE 10 2009 036 970 A1, DE 10 2008 061 840 A1.

In accordance with the invention, the stress corrosion cracking of the rolled up thin glass film by water, as described at the outset, is counteracted by the application of at least one further layer to a radially outer side of the rolled up thin glass film that is particularly under tensile stress, said at least one further layer comprising a desiccant which protects the thin glass film against stress corrosion cracking. The radially outer side refers here to that side of the thin glass film which in cross section, perpendicularly to the longitudinal direction of the roll into which the thin glass film has been rolled up, in radial direction represents the outside of each of the film plies in the roll. In the rolled up state, a radially outer side of the thin glass film is exposed to higher intrinsic tensile stress than a radially inner side of the thin glass film, which is generally exposed to a compressive stress. The radially outer side is therefore more highly susceptible to stress corrosion cracking than the radially inner side of the thin glass film.

In accordance with the invention, the layer containing the desiccant is applied preferably over the surface of the outer side of the rolled up thin glass film, and is therefore in close contact with the side that is greatly stressed by the tensile stress within the thin glass film.

Coated over the surface here means that a substantially coherent film is produced which has no deliberate, often regular, perforations of small volume, such as a perforation or a printed pattern, for example. Based on the geometry of the thin glass film, however, sub-regions may be kept free from the coating. "Over the surface", then, does not mean that the entire surface of the thin glass ribbon or section need be coated. For example, sub-regions at the edge may be kept free for the application of an edge protector. With particular preference the layer comprising the desiccant is applied over the full area to the radially outer side of the rolled up thin glass film. In this case the entire area of the thin glass ribbon or section is coated.

The at least one further layer may comprise one, two or a higher number of layers of adhesive, and may preferably further comprise one, two or a higher number of carrier material layers.

The desiccant binds water which has penetrated the thin glass composite, and thereby prevents propagation of the stress corrosion cracking.

The rolled up thin glass composite preferably, over the entire extent of the thin glass film, has an adhesive layer which is applied over the full area directly to the thin glass film, and a carrier material layer which is applied over the full area directly to the adhesive layer. The construction of the composite is the same over its entire superficial extent, and so is inexpensive to produce, and the rolled up composite can be stored more easily.

With regard to the method of the invention for storing a thin glass film, a thin glass film is provided, and at least one further layer is applied over the surface to at least one side of the thin glass film, said further layer being supplied beforehand with a desiccant which protects against stress corrosion cracking. The thin glass film provided with the at least one further layer is rolled up in such a way that the at least one further layer is applied to a radially outer side of the rolled up thin glass film.

As a result it is possible in accordance with the invention for the thin glass composite composed of the thin glass film and the at least one further layer to be rolled up and stored for a long time without the thin glass film becoming unusable in the course of storage, as a result of stress corrosion cracking.

Carrier material of the carrier material layer of the thin glass composite of the invention may be sheetlike textile structures, papers, plastic-coated papers or films, with preference being given to films, especially dimensionally stable polymeric films or metal films. The carrier material layer or the carrier material therefore consists preferably of polyesters, more particularly of polyethylene terephthalate, as for example of biaxially oriented polyethylene terephthalate, or of olefins, more particularly of polybutene, cyclo-olefin copolymer, polymethylpentene, polypropylene or polyethylene, as for example of monoaxially oriented polypropylene, biaxially oriented polypropylene, or biaxially oriented polyethylene. Polyester films have the advantage that they ensure temperature stability and introduce an increased mechanical stability. Especially preferably, therefore, the carrier layer or the carrier material in the adhesive tape used in the method of the invention consist of a polyester film, as for example biaxially oriented polyethylene terephthalate.

Further preferred are polymer films of relatively high temperature stability, from the group of the polyimides, polyethylene naphthalates, polysulfones, polyethersulfones, polyetherketones or polyarylenes, since they have better mechanical properties in the processing of the thin glass composite at temperatures above 150° C., as in the case of coating with indium tin oxide (ITO), for example.

In one preferred embodiment, the at least one further layer comprises a barrier function. The barrier function hinders one or more specific permeates, more particularly water vapor, from penetrating the thin glass composite, so that the desiccant in the adhesive tape is not partly or even completely saturated by water diffusing in from the environment, actually during the production and/or storage of the adhesive tape.

The barrier function is preferably formed by a barrier layer. The barrier layer is formed advantageously between the thin glass film and the layer of adhesive, or between the carrier layer and the layer of adhesive.

A barrier layer of this kind may consist of organic or inorganic materials, as for example of a metal layer or an organic layer or a sol-gel layer. Furthermore, the barrier function protects the sheetlike structure to be free from water against water from the environment before the water has diffused in.

The barrier layer is provided preferably on an inside, on the side of the carrier material layer that faces the layer of adhesive, since in this way the barrier layer is better protected against damage.

With particular preference the carrier material comprises at least one inorganic barrier layer. Suitable inorganic barrier layers include metals which are deposited particularly well under vacuum (for example, by vaporization, CVD, PVD, PECVD) or under atmospheric pressure (for example, by means of atmospheric plasma, reactive corona discharge or flame pyrolysis), such as aluminum, silver, gold, nickel or, in particular, metal compounds such as metal oxides, nitrides or hydronitrides, examples being oxides or nitrides of silicon, of boron, of aluminum, of zirconium, of hafnium or of tellurium, or indium-tin oxide (ITO). Likewise suitable are layers of the aforementioned variants that are doped with further elements.

Particularly suitable methods for applying an inorganic barrier layer are high-power impulse magnetron sputtering and atomic layer deposition, which allow the realization of layers which are particularly impervious to permeation, while imposing a low temperature load on the carrier layer. Preference is given to a permeation barrier of the carrier layer with barrier function, or of the composite composed of carrier layer and barrier layer, against water vapor (WVTR) of $<1$ g/(m$^2$*d) and/or against oxygen (OTR) of $<1$ cm$^3$/(m$^2$*d*bar), the value being based on the respective carrier layer thickness used in the sheetlike structure, and hence not being standardized to a specific thickness. The WVTR is measured at 38° C. and 90% relative humidity in accordance with ASTM F-1249, and the OTR is measured at 23° C. and 50% relative humidity in accordance with DIN 53380-Part 3.

Between the thin glass film and the carrier material layer there is preferably at least one layer of adhesive. Also envisaged preferably are two or a higher number of layers of adhesive, arranged one above another, between the thin glass film and the carrier material layer. Further carrier material layers as well are conceivable.

The partial assembly composed of a layer or layers of adhesive and optionally a layer or layers of carrier material is also referred to below as adhesive tape or adhesive tape section. The adhesive tape consists at least of a layer of adhesive. This layer is often provided on a carrier material. Further layers, of the kind customary to the skilled person in the area of adhesive tapes, may likewise be present, such as, for example, further layers of adhesive or of carrier material, primer or release layers, or layers having specific physical functions, more particularly optically active layers, permeation-inhibiting or -promoting layers, thermally or electrically conductive layers. The adhesive tape or the adhesive tape section may be provided in the form, for example, of a sheet or a roll or a diecut. It may fully cover the area bounded by its outer periphery, or else may leave parts of that area free, as in the case of a framelike diecut or a perforated section, for example. The layer of adhesive arranged directly on the glass film is preferably a layer of pressure-sensitive adhesive or an activatable layer of adhesive.

Pressure-sensitive adhesives are adhesives whose set film at room temperature in the dry state remains permanently tacky and adhesive. Pressure-sensitive adhesives permit a durable bond to the substrate even under relatively gentle applied pressure.

The adhesive agent applied on the carrier material layer is preferably a pressure-sensitive adhesive or activatable adhesive. More preferably the adhesive lying on the carrier material layer is a pressure-sensitive adhesive.

In general a distinction is made between pressure-sensitive adhesives for permanent applications and for reversible applications (reversibly formulated pressure-sensitive adhesives). Whereas the former are generally redetachable only with high expenditure of force and often with destruction of the substrate or of the adhesive tape itself, the latter can generally be redetached completely without residue with relatively low application of force and without destruction of the substrate.

With preference in accordance with the invention, the adhesive lying on the sheetlike structure, this adhesive being that of the adhesive tape used in the method of the invention, is reversibly formulated.

The reversibility of a pressure-sensitive adhesive may be described by means of its viscoelastic properties.

A substance is regarded generally as being suitable for pressure-sensitive adhesive applications, in terms of its viscoelastic properties, if the storage modulus G' is in the range from $10^3$ to $10^6$ Pa and if the loss modulus G" is likewise within this range at room temperature in the frequency range from $10^0$ to $10^1$ rad/s, ideally in the frequency range from $10^{-1}$ to $10^2$ rad/s. Within this range, which, in a matrix plot of G' and G" (G' plotted as a function of G"), may also be termed the viscoelastic window for pressure-sensitive adhesive applications, or as the pressure-sensitive adhesive window according to viscoelastic criteria, there are in turn different sectors or quadrants which more closely characterize the pressure-sensitive properties to be expected of each of the associated substances. According to Chang (J. Adhesion, 1991, Vol. 34, pages 189 to 200), reversible pressure-sensitive adhesives are characterized by G' in the range from $10^3$ to $3\times10^4$ Pa and G" in the range from $10^3$ to $3\times10^4$ Pa, in each case at room temperature and a measuring frequency of $10^{-2}$ rad/s.

Storage modulus and loss modulus for pressure-sensitive adhesives are determined here in an oscillatory shear experiment (dynamic mechanical analysis, DMA) under torsional load at a temperature of 23° C. and a frequency of 0.01 rad/s. The test is used to investigate rheological properties and is described comprehensively in Pahl et al. "Praktische Rheologie der Kunststoffe and Elastomere", VDI-Verlag, 1995, pages 57 to 60 and also 119 to 127). The test is run in a shear rate-controlled rheometer under torsional load, using a plate/plate geometry with a plate diameter of 25 mm.

With preference in accordance with the invention, an adhesive is considered generally to be reversibly formulated when it has a peel adhesion to steel of <3 N/cm, preferably of <2.2 N/cm.

In accordance with the invention, all pressure-sensitive adhesives known to the skilled person may be used for the rollable thin glass composite of the invention, such adhesives therefore being, for example, those based on acrylates and/or methacrylates, polyurethanes, natural rubbers, synthetic rubbers; styrene block copolymer materials with an elastomer block composed of unsaturated or hydrogenated polydiene blocks such as polybutadiene, polyisoprene, copolymers of both, polybuylene, more particularly polyisobutylene, and also further elastomer blocks familiar to the skilled person, for example; polyolefins, more particularly poly-α-olefins and/or polyisobutylenes; fluoropolymers and/or silicones. The term "pressure-sensitive adhesives" also covers further materials which possess pressure-sensitive adhesive properties in line with the "Handbook of Pressure Sensitive Adhesive Technology" by Donatas Satas (Satas & Associates, Warwick 1999).

Where acrylic-based pressure-sensitive adhesives are mentioned in the context of this specification, the intention thereby, even when not explicitly stated, is that this should encompass pressure-sensitive adhesives based on methacrylates and based on acrylates and methacrylates, unless expressly described otherwise.

Activatable adhesives are considered to be adhesive systems where the production of a peel adhesion at all, or the increase in or lowering of the peel adhesion, occurs as a result of introduction of energy, by means of actinic radiation or heat, for example, or by a physical interaction. The activation is preferably used to bring about reversibility of the adhesive bonding, especially when a pressure-sensitive adhesive before being activated is not accorded the status of reversible pressure-sensitive adhesives (Chang, J. Adhesion, 1991, vol. 34, pages 189 to 200). Activatable pressure-sensitive adhesives of this kind are known, for example, from the sector of the grinding and dicing adhesive tapes which are used in wafer machining.

As activatable adhesives it is possible in principle for all customary adhesive systems which undergo activated bonding to be employed. The activation in accordance with the invention is accomplished preferably in general via an input of energy—for example, and with particular preference, by actinic radiation or heat (heat-activatedly disbonding adhesives).

In accordance with the invention, so-called "autoadhesive" layers as well are considered to be reversibly formulated pressure-sensitive adhesives. Autoadhesive layers are employed, for example, in display protection films. They exhibit very little adhesiveness to the touch, or none at all, but attach in particular to very smooth surfaces. Autoadhesive layers are described for example in WO 2005/044560 A1 or DE 197 42 805 A1.

The rollable thin glass composite of the invention preferably comprises at least one layer of adhesive, applied to the surface of the thin glass film, and preferably at least one carrier material layer arranged on the side of the layer of adhesive that is opposite to the thin glass film; the at least one layer of adhesive and/or the optional carrier material layer comprise/comprises a desiccant.

The at least one layer of adhesive preferably comprises a desiccant, since in that case the desiccant is directly adjacent to the glass surface and is therefore particularly effective.

A layer of adhesive comprising the desiccant may be provided here between the thin glass film and the carrier material layer. In another embodiment of the invention, further layers, such as further layers of adhesive, for example, are arranged one above another between the thin glass film and the carrier material layer, and the layer comprising the desiccant is arranged between the carrier material layer and a layer of adhesive, preferably pressure-sensitive adhesive layer.

A desiccant here refers to a substance which is capable of taking up (sorption) water. The sorption of the water by the desiccant may occur for example through absorption or adsorption, and adsorption may occur in the form of chemisorption or in the form of physisorption. The desiccant could therefore also be termed a "sorbent" or "sorption agent".

In accordance with the invention, therefore, the desiccant provides the rollable thin glass composite with the ability to take up water from the carrier material layer, or else to take up water from the thin glass film itself, and to take up water passing through the thin glass film and/or the carrier material layer. Examples of suitable desiccants are salts such as cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium dithionite, sodium carbonate, sodium sulfate, potassium disulfite, potassium carbonate, magnesium carbonate; phyllosilicates such as montmorillonite and bentonite; metal oxides such as barium oxide, calcium oxide, iron oxide, magnesium oxide, sodium oxide, potassium oxide, strontium oxide, aluminum oxide (activated alumina), and titanium dioxide; additionally, carbon nanotubes, activated carbon, phosphorus pentoxide; readily oxidizable metals such as, for example, iron, calcium, sodium, and magnesium; metal hydrides, such as, for example, calcium hydride, barium hydride, strontium hydride, sodium hydride, and lithium aluminum hydride; hydroxides such as potassium hydroxide and sodium hydroxide; metal complexes such as aluminum acetylacetonate, for example; furthermore, silicas such as silica gel, for example; kieselguhr; zeolites; furthermore, organic absorbers, examples being polyolefin copolymers, polyamide copolymers, PET copolyesters, anhydrides of single and multiple carboxylic acids such as acetic anhydride, propionic anhydride, butyric anhydride or methyltetrahydrophthalic anhydride, or other absorbers based on hybrid polymers, used usually in combination with catalysts such as cobalt, for example; carbodiimides; further organic absorbers such as, for instance, weakly crosslinked polyacrylic acid, polyvinyl alcohol, ascorbates, glucose, gallic acid, or unsaturated fats and oils.

In accordance with the invention it is also possible to use mixtures of two or more drying materials.

Desiccants here are expressly not silanes, since silanes react chemically with the glass surface and are used conversely as adhesion promoters for adhesive bonds on glass. A further layer connected in this way to the thin glass film would hardly be capable of subsequent detachment from the thin glass film without destroying it. By silanes in turn are meant compounds of the general formula $R_a$—Si—$X_{4-a}$ or partial condensation products thereof. In the formula, a is an integer from 0 to 3 and preferably 0 or 1. X is a hydrolyzable group, as for example and preferably a halogen atom, more particularly chlorine, an alkoxy group such as, for example, a methoxy, ethoxy, n-propoxy, isopropoxy, n-butoxy, sec-butoxy or tert-butoxy group, or an acetoxy group. Further examples of hydrolyzable groups, known to the skilled person, can likewise be employed for the purposes of the present invention. Where there are two or more substituents X present, they may be identical or different from one another. R is an optionally substituted hydrocarbon radical, as for example a methyl, ethyl, n-propyl, isopropyl, n-butyl, sec-butyl or tert-butyl group, a pentyl group, and also branched isomers thereof, a hexyl group and also the branched isomers, a heptyl group and also the branched isomers, an octyl group and also the branched isomers, a nonyl group and also the branched isomers, a decyl group and also the branched isomers, an undecyl group and also the branched isomers, a dodecyl group and also the branched isomers, a tetradecyl group and also the branched isomers, a hexadecyl group and also the branched isomers, an octadecyl group and also the branched isomers, or an eicosyl group and also the branched isomers. The hydrocarbon radicals may also contain cyclic and/or aromatic components. Representative structures of these are cyclohexyl, phenyl, and benzyl groups. The one or more hydrocarbon radicals R optionally include, for example, one or more heteroatom-containing substituents such as amino groups, aminoalkyl groups, glycidyloxy groups, (meth)acryloyloxy groups, and the like. Where there are two or more substituents R present, they may be identical or different from one another.

With particular preference the desiccant is selected from the group encompassing cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, sodium sulfate, potassium carbonate, zeolites, calcium, magnesium, barium oxide, calcium oxide, magnesium oxide, sodium oxide, potassium oxide, strontium oxide, activated carbon, phosphorus pentoxide, calcium hydride, barium hydride, strontium hydride, sodium hydride, and lithium aluminum hydride, potassium hydroxide, sodium hydroxide, acetic anhydride, propionic anhydride, butyric anhydride, methyltetrahydrophthalic anhydride, and carbodiimides, and also mixtures of two or more of the above substances. These materials have a high sorption capacity for water.

By "carbodiimides" are meant compounds of the general formula $R^1$—N=C=N—$R^2$, where $R^1$ and $R^2$ are organic radicals, more particularly alkyl or aryl radicals, which may be alike or different.

Very preferably the desiccant is selected from the group encompassing barium, calcium, calcium sulfate, calcium chloride, calcium oxide, sodium sulfate, potassium carbonate, copper sulfate, magnesium perchlorate, magnesium sulfate, lithium chloride, and zeolites, and also mixtures of two or more of the above substances. The advantage offered by these desiccants is that they are readily incorporable into the relevant layer of the adhesive tape, exhibit high sorption capacity, and are regenerable desiccants. By these are meant substances which are able to give up water again under certain conditions and so enter a state which makes them capable of renewed water uptake. This opens up the possibility of a process in which the adhesive tape containing the desiccant, before being contacted with the sheetlike structure, is largely freed, by drying, for example, of any water it has taken up until that point in time. As a result, when the adhesive tape is used, advantageously, the full desiccant capacity is available.

More particularly the desiccant is selected from the group encompassing calcium oxide, calcium sulfate, calcium chloride, fumed silicas, and zeolites, and also mixtures of two or more of the above substances. These materials have particularly high capacities for the uptake of water, are very largely regenerable, can be incorporated outstandingly into the adhesive tape, and have only a negligible adverse effect, or none at all, on the function of the individual layers.

In one particular embodiment of the invention, the desiccant is selected from calcium oxide, calcium, iron, barium, lithium chloride, and cobalt chloride. These substances provide information on the water content of the sheetlike structure via a change in their optical properties. Therefore, as long as free desiccant capacity is still apparent from the visual appearance of the adhesive tape, this may be taken as an indication of the fact that so far no water, or little water at most, has diffused into the sheetlike structure for protection. Metallic calcium, for example, loses its metallically opaque appearance and becomes increasingly transparent; cobalt chloride on water uptake changes color from blue to pink. The desiccant calcium oxide is used in particular.

The fraction of the desiccant in the layer of adhesive comprising the desiccant is advantageously in each case at least 1 wt %, preferably at least 10 wt %, based in each case on the weight of the desiccant layer. The maximum fraction of the desiccant in the layer of the adhesive tape that comprises the desiccant is not limited in each case and may range up to a layer composed of pure desiccant.

The amount is dependent essentially on the desired uptake capacity for the water. If, for example, only a low uptake capacity is needed, the use of a desiccant in a small amount and with low uptake capacity may be sufficient. In one preferred embodiment, the layer or layers comprising the desiccant therefore each contain 1 to 5 wt % of desiccant. If this layer is the adhesive of the adhesive tape, this also has the advantage that the small proportion of the desiccant does not substantially detract from the adhesive properties.

Where the required uptake capacity of the adhesive tape is very high, however, it is necessary to use a relatively high amount of desiccant in the desiccant-comprising layer, and the desiccant ought also to possess a high uptake capacity. However, even a desiccant with low uptake capacity can be used if this is advisable from aspects of cost or compatibility. In a further preferred embodiment of the sheetlike structure of the invention, therefore, that structure contains 20 to 99 wt %, based on the total weight of the adhesive tape.

Where the desiccant-comprising layer is an adhesive, a preferred amount is from 10 to 80 wt %, to retain sufficient adhesive properties. If, however, the reversibility of the adhesive is to be increased or actually brought about, an amount of 50 to 95 wt % is advantageous, based in each case on the total weight of the desiccant-comprising adhesive.

The adhesive tape preferably has a water content of less than 1000 ppm, more preferably of less than 100 ppm. The ppm figure here is based on the relation between the total weight of water present and the weight of the adhesive tape. The water content may be determined by DIN EN ISO 62 (gravimetric method, method 4) or DIN 53715 (Karl-Fischer titration) after storage of the test specimen at 23° C. and 50% relative humidity for 24 hours. In the case of low water contents, the capacity of the drying materials in the adhesive tape is not so greatly taken up by water diffusing from the adhesive tape itself, and the adhesive tape is able better to fulfill its function as a means of protection and/or of drying.

With particular advantage, at least one layer of the adhesive tape, more preferably at least one of the outer layers of the adhesive tape, very preferably the layer of adhesive which is intended for placement on the glass film has a low water vapor permeation rate for the water to be immobilized. The water vapor permeation rate (WVTR) is preferably less than 50 g/(m$^{2*}$d), more preferably less than 20 g/(m$^{2*}$d), based on a layer thickness of 50 μm. The WVTR here is measured at 38° C. and 90% relative humidity in accordance with ASTM F-1249.

As a result of the low water vapor permeation rate, especially during the production of the adhesive tape, relatively little water diffuses from the environment through the relevant layer or layers into the desiccant-comprising layer of the adhesive tape, which can therefore fulfill its function for longer, despite low getter content, or can be equipped with an even smaller amount of drying material, saving on costs. With particular preference, therefore, at least the two outer layers of the adhesive tape have a low water vapor permeation rate for the water to be immobilized.

As (pressure-sensitive) adhesives with inherent barrier effect, more particularly as (pressure-sensitive) adhesives of such kind that have a water vapor permeation rate of less than 50 g/(m$^{2*}$d) in a thickness of 50 μm, it is possible for example—without any intention to limit them to the stated examples—to use adhesives of the kind as disclosed in specifications DE 10 2010 043 871 A1, DE 10 2010 043 866 A1, DE 10 2008 060 113 A1, DE 10 2008 062 130 A1, DE 10 2008 047 964 A1, DE 10 2009 036 970 A1, DE 10 2009 036 968 A1, US 2009/0026934 A1, EP 1 469 054 B1 and EP 0 519 278 B2.

In view of the generally relatively low water vapor permeation rate, preference is given to using adhesives based on synthetic rubbers, more particularly based on polyisobutylene and its copolymers, polybutene, butyl rubber, styrene block copolymers with polymer blocks formed by polymerization of 1,3-dienes, more particularly butadiene, isobutylene and/or isoprene, which may also contain specifically or fully hydrogenated polymer blocks, and also polyolefins and copolymers thereof (see also DE 197 42 805 A1).

The adhesive in the adhesive tape that lies atop the sheetlike structure is preferably free from tackifier resins. This has the effect generally of further improving the reversibility of the adhesive bonding.

Applied preferably to the thin glass film, in addition to the at least one further layer, is a coating which stabilizes the thin glass surface; more particularly, an organic or sol-gel coating is applied to the thin glass surface. The coating also reduces the diffusion of water and water vapor to the glass surface. Organic coatings may also reduce the stress corrosion cracking. Coatings of this kind are disclosed for example in H. Furuchi; Glass Technology Vol. 35 (No. 6) 1994, pages 272 to 275; M. Mizuhashi. et al.; Reports Res. Lab. Asahi Glass Co. ltd.; 36[1] (1986), pages 1 to 14 and H. K. Schmidt; 3'd Conference European Society of Glass Science and Technology (ESG), Wurzburg 1995.

A reversible adhesive advantageously comprises a silane which is incompatible with the adhesive, or a silane which is unable to enter into any covalent, ionic or coordinative bonding with the adhesive. On the one hand, this has the effect of preventing increased adhesion of the reversible adhesive to the thin glass film; on the other hand, the incompatibility of the silane with the adhesive agent causes migratable silane molecules to accumulate on the surface of the adhesive and therefore to come into contact, in relatively large amounts, with the thin glass film. The silane film on the glass allows microcracks to be bridged, and the glass stability can be increased.

In a further embodiment of the invention, the layer of adhesive comprises a hydrophobic silane. The hydrophobic silane here is defined as a silane having more than seven coherent carbon atoms, for example being octadecyldimethylchlorosilane.

Figure 2:
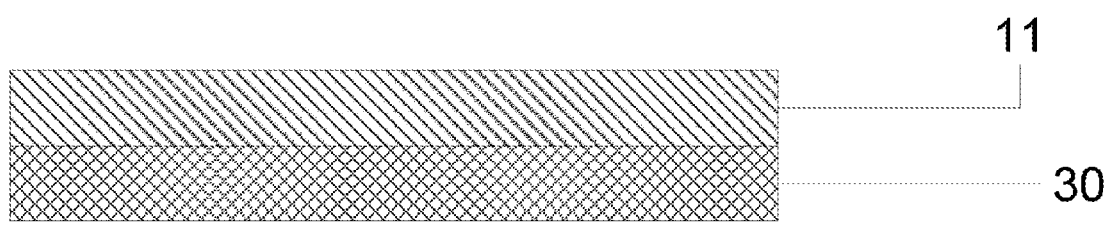
Figure 3A:
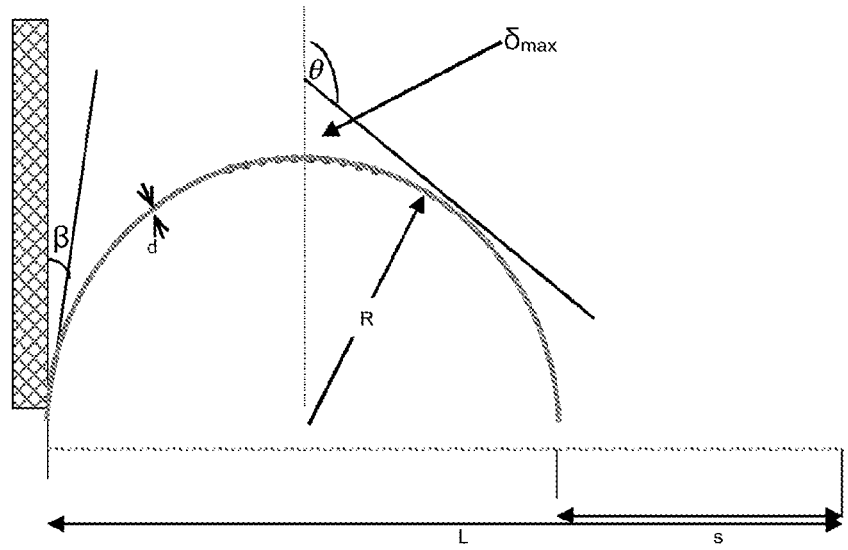
Figure 3B:
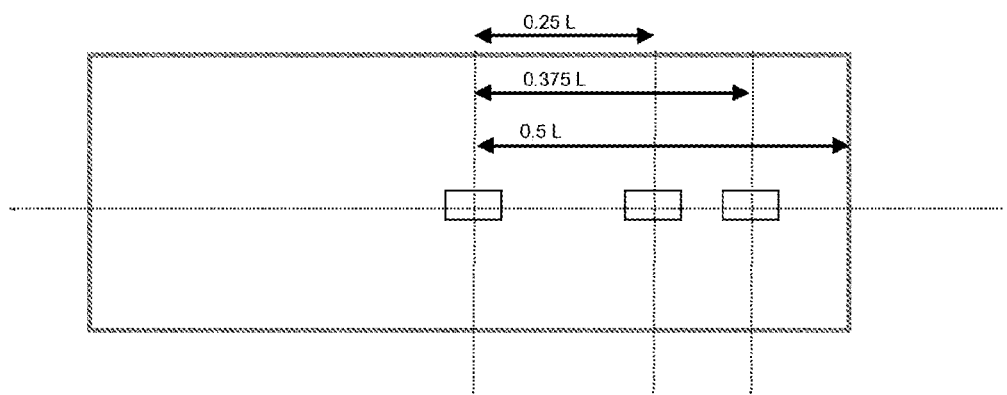
Figure 3C:
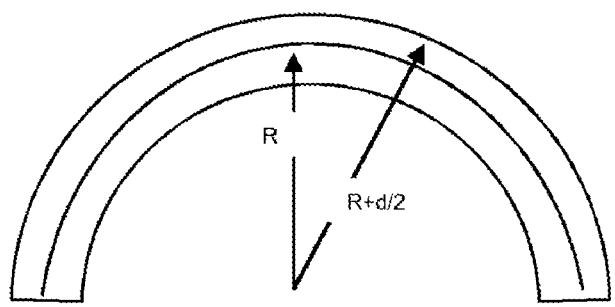

The invention is described using exemplary embodiments in five figures. In the figures:

FIG. 1 shows a sectional view of a schematic construction of an inventive adhesive tape for a thin glass composite, FIG. 2 shows a schematic view of a second embodiment of an inventive adhesive tape for a thin glass composite, FIG. 3a shows a representative drawing of the bent thin glass composite in a two-point bending test, FIG. 3b shows a schematic view of the strain gauges arranged on the thin glass composite, FIG. 3c shows a schematic side view of the bent thin glass.

Described first of all is the production of different layers of adhesive, which are then investigated for their water vapor permeation rate and peel adhesion to float glass.

For the production of layers of adhesive, different adhesives were applied from a solvent to a Silphan S75 M371 liner from Siliconature by means of a laboratory coater, and then dried.

Reported in table 4 in each case is the thickness of the layer of adhesive after drying. It is 50 μm.

Drying took place in each case at 120° C. for 30 minutes in a laboratory dryer.

| K1: Pressure-sensitive adhesive | | |
|---|---|---|
| 100 parts | Tuftec P 1500 | SBBS, a partly hydrogenated styrene-butadiene-styrene block copolymer (SBS), with 30 wt % block polystyrene content, from Asahi. The SBBS contains about 68 wt % diblock content. |
| 100 parts | Escorez 5600 | Hydrogenated HC resin having a softening point of 100° C., from Exxon |
| 25 parts | Ondina 917 | White oil comprising paraffinic and naphthenic fractions, from Shell |

The solvent used was a mixture of toluene and acetone in a ratio of 2:1.

| K2: Reversible pressure-sensitive adhesive | | |
|---|---|---|
| 90 parts | Butyl 100 | Butyl rubber from Bayer, isoprene content 0.9 mol % |
| 10 parts | Hyvis 200 | Polybutene from BP Chemical |

The solvent used was special-boiling-point spirit.

| K3: Reversible pressure-sensitive adhesive | | |
|---|---|---|
| 80 parts | Butyl 100 | Butyl rubber from Lanxess, isoprene content 0.9 mol % |
| 10 parts | Oppanol B 150 | Polyisobutylene (PIB) from BASF, Mn = 425 000 g/mol |

| K3: Reversible pressure-sensitive adhesive (continued) | | |
|---|---|---|
| 10 parts | Regalite R 1100 | Hydrogenated hydrocarbon resin from Eastman with a softening point of 100° C. |

The solvent used was special-boiling-point spirit.

| K4: Reversible pressure-sensitive adhesive | | |
|---|---|---|
| 100 parts | Levapren 700 | Polyethylene-vinyl acetate, manufacturer Bayer, vinyl acetate fraction 70 wt % |
| 30 parts | Levapren 800 | Polyethylene-vinyl acetate, manufacturer Bayer, vinyl acetate fraction 80 wt % |
| 25 parts | Levapren 450 | Polyethylene-vinyl acetate, manufacturer Bayer, vinyl acetate fraction 45 wt % |

The solvent used was methyl ethyl ketone.

| K5: Radiation-activatedly reversible pressure-sensitive adhesive | | |
|---|---|---|
| 59 parts | | Acrylate copolymer consisting of 56 wt % butyl acrylate, 40 wt % methyl acrylate, 2 wt % acrylic acid, and 2 wt % benzoin acrylate, prepared in radical polymerization by the method disclosed in DE 195 20 238 02 (example 1) |
| 0.4 part | Aluminum acetylacetonate | |
| 28 parts | Ebecryl 220 | Hexafunctional, aromatic urethane-acrylate oligomer from Cytec |
| 12 parts | PETIA | Pentaerythritoltri-tetraacrylates from Cytec with a tri-tetra ratio of about 1:1 |

| K6: Reversible pressure-sensitive adhesive | | |
|---|---|---|
| 85 parts | Oppanol B 150 | PIB from BASF, Mn = 425 000 g/mol |
| 15 parts | Oppanol B 50 | PIB from BASF, Mn = 120 000 g/mol |

The solvent used was special-boiling-point spirit.

The water vapor permeation rate (WVTR) of the layers of pressure-sensitive adhesive was measured at 38° C. and 90% relative humidity in accordance with ASTM F-1249. ASTM F-1249 is a standard test method for determining the water vapor permeation rate (ASTM International, 100 Barr Harbor Drive, PO Box C700, West Conshohokecken, Pa. 19428-2959, USA according to the presently valid version of 22 Jun. 2006). The WVTR value reported in table 1 is an average value from two measurements in each case. The value reported is standardized for a layer thickness of 50 μm.

The peel adhesion was determined on float glass in analogy to ISO 29862 (method 3) at 23° C. and 50% relative humidity, with a peel rate of 300 mm/min and a peel angle of 180°. The reinforcing film used, to which the respective layer of adhesive was applied, was the polyester film F1 indicated further below. The polyester film was first laminated to the dried adhesive strips. The bonding of the measurement strip, this being the film with the layer of adhesive agent, was performed using a roll-on machine at a temperature of 23° C. The adhesive tapes were peeled under the conditions stated above after 24 hours of storage. The value reported is the average value from three measurements.

TABLE 1

| Identification | WVTR [g/m² d] | Peel adhesion/glass [N/cm] |
|---|---|---|
| K1 (not reversible) | 68 | 6.9 |
| K2 | 44 | 1.5 |
| K3 | 18 | 2.0 |
| K4 | 155 | 1.2 |
| K5 | 569 | 1.7 before/0.2 after UV |
| K6 | 6 | 0.9 |

On determination of the peel adhesion, the desiccants were not yet present in the layer of adhesive.

First of all it is clearly apparent that adhesive K1 is a nonreversible pressure-sensitive adhesive, while adhesives K2 to K6 are reversible pressure-sensitive adhesives. Reversible pressure-sensitive adhesives can easily be peeled by hand, since they have a peel adhesion of less than 3 N/cm, preferably of less than 2.2 N/cm.

For the production of the layers of adhesive of the invention comprising desiccants, the solutions of the pressure-sensitive adhesives are admixed with a desiccant. These desiccants are incorporated into the solutions of adhesive by means of a high-speed dispersing disk of a laboratory stirring apparatus. The solutions of adhesive are dried beforehand using zeolite beads with a size of approximately 1 mm, which are filtered out again prior to coating.

Drying materials used were as follows:

TABLE 2

| Identification | Description | Trade name | Supplier |
|---|---|---|---|
| G1 | Calcium oxide | Calcium oxide nanopower | Sigma-Aldrich |
| G2 | Zeolite 3A | Purmol 3 STH | Zeochem |

As carrier material layer 30 for the adhesive tapes, two films were used, a polyester film F1 and also a polyester film with inorganic barrier layer F2, which are set out below:

TABLE 3

| Identification | Description | Trade name | Supplier | Thickness [µm] | WVTR [g/m² d] |
|---|---|---|---|---|---|
| F1 | Polyester film | Melinex 723 | Dupon-Teijin-Films | 36 | 64 |
| F2 | Polyester film with inorganic barrier layer | GX-P-F | Toppan Printing | 30 | 0.13 |

The adhesive tapes were produced in different ways depending on the carrier material.

For the production of a construction according to FIG. 2, using carrier material F1, the solutions are coated directly onto the carrier material 30 and dried to eliminate solvent. The dried layers 11 of desiccant-comprising adhesive were furnished temporarily with a liner after drying in each case.

For the production of a construction according to FIG. 2, using carrier material F2, the solutions are coated onto the above-stated liner and dried to eliminate solvent. The dried layers 11 of desiccant-comprising adhesive were laminated immediately after drying in each case at further elevated temperature (about 60° C.) to the carrier material 2, using a laboratory roll laminator.

In the embodiment according to FIG. 1, the construction according to FIG. 2 has its liner removed, and an outer layer 10 of adhesive, which lies directly on the glass film, is laminated onto the now exposed side of the desiccant-comprising layer 20, using a laboratory roll laminator. The layer 10 of adhesive contains no drying material and was produced as described above by means of coating on the stated liner.

Table 4 shows, in an overview, adhesive tapes produced according to the second embodiment in FIG. 2, and also according to the first embodiment as per FIG. 1. According to the second embodiment, the adhesive tapes T1 to T8 and T10 to T16 are produced. The adhesives K1, K4, and K5 here have a WVTR of more than 50 g/m²d (per square meter per day).

Only adhesive tape T9 was produced according to FIG. 1, with the desiccant being dispersed in adhesive K1 and used as "layer comprising drying material 20" in a thickness of 40 µm. The reversible adhesive K4 was used as layer 10 of adhesive.

As a comparative example (C1), an adhesive tape was produced in which the adhesive contains no drying material at all; the adhesive has a water vapor permeation rate of more than 50 g/m²d, and the carrier material layer 30 has a water vapor permeation rate of more than 10 g/m²d. (C1).

Further adhesive tapes without drying material were also produced (C2, C3, C4), their adhesive having a water vapor permeation rate, when adhesive K1 was used, of more than 50 g/m²d, or less than 50 g/m²d, namely when adhesive K6 was used. The carrier material layer 30 either has a water vapor permeation rate of more than 10 g/m²d, when carrier film F1 is used, or of less than 10 g/m²d, when carrier film F2 is used.

TABLE 4

| Identification | Adhesive | Getter material | Fraction of getter [wt %] | Thickness of layer of adhesive [µm] | Carrier |
|---|---|---|---|---|---|
| T1 | K2 | G1 | 5 | 50 | F2 |
| T2 | K3 | G1 | 5 | 50 | F1 |
| T3 | K3 | G1 | 5 | 50 | F2 |
| T4 | K4 | G1 | 5 | 50 | F2 |
| T5 | K5 | G1 | 5 | 50 | F2 |
| T6 | K2 | G2 | 10 | 50 | F2 |
| T7 | K3 | G2 | 10 | 50 | F1 |
| T8 | K3 | G2 | 10 | 50 | F2 |
| T9 | K4 | G2 | 10 | 50 | F2 |
| T10 | K5 | G2 | 10 | 50 | F2 |
| T11 | K1/K4 | G2 in K1 | 10 | K1: 40; K2: 10 | F2 |
| T12 | K1 | G2 | 10 | 50 | F2 |
| T13 | K6 | G2 | 10 | 50 | F1 |
| T14 | K6 | G2 | 10 | 50 | F2 |
| T15* | K6 | G2 | 10 | 50 | F2 |
| T16 | K5 | G2 | 10 | 50 | F2 |
| C3 | K6 | — | 0 | 50 | F1 |
| C4 | K6 | — | 0 | 50 | F2 |
| C2 | K1 | — | 0 | 50 | F2 |
| C1 | K1 | — | 0 | 50 | F1 |

*Adhesive K6 in example T15 contained additionally 5% of tetraethoxysilane, which was added to the solution after the addition of the desiccant.

Before being laminated to the thin glass, the adhesive tapes of the invention are stored temporarily in a permeation-proof packaging, by being welded into a composite aluminum foil. The specimens for determining the water content were taken after 14 days of storage.

Table 5 shows the determination of the water content after 14 days of storage (fourth column from right). The water content is determined by means of DIN 53715 (Karl Fischer titration). The measurement takes place in a Karl Fischer Coulometer 851 in conjunction with an oven sampler (oven temperature 140° C.). With an initial mass of approximately 0.3 g, a triple determination was carried out in each case. The water content reported is the arithmetic mean of the measurement.

The thin glass used was D263 T glass from Schott, Mainz, with a thickness of 70 μm and a length of 100 mm, and the width likewise of 100 mm. A thin glass of this type was laminated over virtually the full area with the respective adhesive tape at room temperature, using a laboratory roll laminator, with just a strip approximately 9 mm wide being left free at the edges transversely to the flexural axis. In order to rule out edge effects, a stabilizing strip of adhesive tape tesa 50575 (80 μm aluminum foil with pressure-sensitive acrylate adhesive) approximately 10 mm wide was bonded along both edges of the thin glass film, transversely to the flexural axis, thus protruding approximately 1 mm beyond the glass edge. In the course of the flexural test, these aluminum strips come to lie on the outside of the radius of flexure, and ensure that the glass edge is held under compressive stress, thereby significantly reducing the risk of cracks originating from the edge.

Subsequently, a minimum radius of flexure R without storage was ascertained (second column from right in table 5).

Assemblies of thin glass and adhesive tape, produced equivalently, were further stored over 28 days at 60° C. in 90% relative humidity with a radius of flexure of 100 mm, with the side of the glass protected by the adhesive tape lying on the outside of the radius and hence being exposed substantially to a tensile stress. This was followed by determination of the minimum radius of flexure after storage (far right column in table 5).

Table 5 shows the comparison of the radii of flexure before and after storage in the two right-hand columns. Additionally, an assessment was made of the reversibility of the adhesives, subjectively, on detachment of the adhesive tape from the thin glass. For this purpose, the assembly with its glass side was adhered, using a strongly adhering adhesive tape Tesa® 4972, to a steel plate, and the protective film was peeled off using the adhered grip tab, starting from one corner. Specimens with the adhesive K5 were crosslinked beforehand with a UV-C dose of 80 mJ/cm$^3$ in the 250 to 260 nm band, using a UV-Cube from Hoenle, to produce the reversibility. Table 5 shows the results:

TABLE 5

| Adhesive tape | Water content of adhesive tape [ppm] | Reversibility ++ very easily detachable + easily detachable o detachable with some force – detachable with high force | Radius of flexure without storage [mm] | Radius of flexure after storage [mm] |
| --- | --- | --- | --- | --- |
| T1 | 68 | + | 31 | 33 |
| T2 | 14 | + | 29 | 38 |
| T3 | 10 | + | 32 | 31 |
| T4 | 7 | + | 29 | 33 |
| T5 | 19 | ++ | 28 | 32 |
| T6 | 18 | + | 31 | 31 |
| T7 | 8 | + | 33 | 39 |
| T8 | 6 | + | 33 | 31 |
| T9 | 13 | + | 32 | 31 |
| T10 | 16 | ++ | 29 | 32 |
| T11 | 10 | + | 34 | 33 |
| T12 | 8 | – | 29 | 34 |
| T13 | 18 | ++ | 30 | 38 |
| T14 | 17 | ++ | 30 | 29 |

TABLE 5-continued

| Adhesive tape | Water content of adhesive tape [ppm] | Reversibility ++ very easily detachable + easily detachable o detachable with some force – detachable with high force | Radius of flexure without storage [mm] | Radius of flexure after storage [mm] |
| --- | --- | --- | --- | --- |
| T15 | 29 | + | 32 | 29 |
| T16 | 21 | ++ | 34 | 35 |
| C3 | 1588 | ++ | 31 | 39 |
| C4 | 1521 | ++ | 33 | 36 |
| C2 | 1966 | – | 34 | 37 |
| C1 | 2004 | – | 29 | 41 |

The results show that thin glass can be effectively protected by the method of the invention. In particular, the embodiments with the film F2 are suitable for the adhesive tape, since this film considerably reduces the inward diffusion of moisture into the assembly.

The use of permeation-inhibiting adhesives K2, K3, and K6 likewise brings advantages relative to more permeable adhesives. Adhesive tapes without drying material, with a carrier material layer 30 comprising the film F2 (C2, C4), also still show a protective effect, although when using the film F1 (C1, C3) as carrier material layer 30, this effect subsides significantly, since under the harsh test conditions, the moisture is able very easily to diffuse into the assembly.

The use of the silane as crack repair agent shows a clear effect, since there is a more significant decrease in the maximum radius of flexure than could be assigned to the random scatterings alone.

The minimum radius of flexure is determined using the two-point bending test. The test method is based on the published Corning method of S. T. Gulati and patent WO 2011/084323 A1 (Gulati et al., ID Symposium Digest of Technical Papers Vol 42, Issue 1, pages 652 to 654, June 2011).

The flexibility of the glass/protective film laminate can be characterized by the two-point bending test. In this test, the minimum radius of flexure is measured and calculated in millimeters shortly before or exactly at the moment of fracture. The laminate lies with its protective film side upward, and is fixed on one side. The other side is displaced at a rate of 10 mm/min in the direction of the fixed end. The resulting radius of flexure is measured or calculated from the displacement. The test setup for the two-point bending test is shown in FIG. 3a. A dotted line 31 represents the position and the length of the thin glass composite prior to flexure. The solid line shows the position of the thin glass composite on minimum flexure at the moment of the first crack occurring transverse to the direction of movement.

L is the length of the thin glass composite 31, s the distance traveled by one end of the thin glass composite during the flexing process up to the point of fracture. The thickness of the laminate is given in abbreviated form as d. β is the contact angle, which is needed in order to calculate the flexural stress. As the contact angle β goes down, in other words as the radius R reduces, there is an increase in the stress on the glass.

The radius R is measured during the test or calculated by the formula below. The flexural elongation $\epsilon$, which is necessary in order to calculate the radius R of flexure, is determined by means of a strain gauge or calculated.

FIG. 3b shows the arrangement of the strain gauge in the center of the thin glass composite.

The radius R of flexure is calculated from the measured flexural elongation ε as follows:

$$\frac{R}{R+\frac{d}{2}} = \frac{L}{L+\Delta L}$$

$$\frac{R}{R+\frac{d}{2}} = \frac{1}{1+\frac{\Delta L}{L}} = \frac{1}{1+\varepsilon}$$

$$R + R\varepsilon = R + \frac{d}{2}$$

$$R = \frac{d}{2\varepsilon}$$

with the flexural elongation ε=ΔL/L, L: original length and length of the middle phase of the thin glass composite with radius R, and ΔL corresponds to the change in length of the outer phase of the thin glass composite with radius $$R + \frac{d}{2}$$

in FIG. 3c.

The minimum radius R of flexure reported in table 5 is the median value from fifteen measurements.

Measurement Methods

Molecular Weight:

The molecular weight determinations of the number-average molecular weights $M_n$ and the weight-average molecular weights $M_w$ (or the other molecular weights) took place by means of gel permeation chromatography (GPC). The eluent used was THF (tetrahydrofuran) with 0.1 vol % of trifluoroacetic acid. The measurement was made at 25° C. The pre-column used was PSS-SDV, 5μ, $10^3$ Å, ID 8.0 mm×50 mm. Separation took place using the columns PSS-SDV, 5μ, $10^3$ and also $10^5$ and $10^6$ each with ID 8.0 mm×300 mm. The sample concentration was 4 g/l, the flow rate 1.0 ml per minute. Measurement was made against polystyrene standards.

Tackifier Resin Softening Temperature:

The tackifier resin softening temperature is carried out according to the relevant methodology, which is known as ring and ball and is standardized according to ASTM E28.

The tackifier resin softening temperature of the resins is determined using an automatic ring and ball device HRB 754 from Herzog. Resin specimens are first of all finely mortared. The resulting powder is placed into a brass cylinder with an opening of the base (internal diameter at the top part of the cylinder 20 mm, diameter of the base opening in the cylinder 16 mm, height of the cylinder 6 mm) and melted on a hot plate. The amount introduced is selected such that the resin after melting fully fills the cylinder without protruding. The resulting specimen, including the cylinder, is inserted into the sample mount of the HRB 754. Glycerol is used to fill the conditioning bath, provided the tackifier resin softening temperature is between 50° C. and 150° C. For lower tackifier resin softening temperatures, it is also possible to operate using a water bath. The test balls have a diameter of 9.5 mm and weigh 3.5 g. In accordance with the HRB 754 procedure, the ball is arranged above the specimen in the conditioning bath, and is laid down on the specimen. At a distance of 25 mm beneath the base of the cylinder there is a catch plate, with a light barrier 2 mm above it. During the measuring operation, the temperature is increased at 5° C./min. In the temperature range of the tackifier resin softening temperature, the ball begins to move through the base opening in the cylinder, before finally coming to rest on the catch plate. In this position it is detected by the light barrier, and at this instant the temperature of the conditioning bath is recorded. A duplicate determination is made. The tackifier resin softening temperature is the average value from the two individual measurements.

LIST OF REFERENCE SYMBOLS

10 Outer layer of adhesive
11 Desiccant-comprising layer of adhesive
20 Desiccant-comprising layer of adhesive
30 Carrier material layer
31 Thin glass composite prior to flexure
d Thickness of thin glass composite
s Displacement of thin glass composite
L Length of thin glass composite
R Radius/radius of flexure
β Contact angle
δ Flexural stress
ε Flexural elongation

The invention claimed is:

1. A rolled up thin glass composite comprising a thin glass film having a thickness of 15 to 200 μm, and at least one further layer applied over the surface of one side of the thin glass film, wherein the at least one further layer is present on the radially outer side of the rolled up thin glass film, and the at least one further layer comprises a desiccant which is adapted to protect the thin glass film against stress corrosion cracking, which dessicant is selected from:

salts, selected from the group consisting of: group cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium dithionite, sodium carbonate, sodium sulfate, potassium disulfite, potassium carbonate, magnesium carbonate;

phyllosilicates, selected from the group consisting of: montmorillonite and bentonite;

metal oxides, selected from the group consisting of: barium oxide, calcium oxide, iron oxide, magnesium oxide, sodium oxide, potassium oxide, strontium oxide, aluminum oxide (activated alumina), and titanium dioxide;

carbon nanotubes;

activated carbon;

phosphorus pentoxide;

oxidizable metals selected from iron, calcium, sodium, and magnesium;

metal hydrides, selected from the group consisting of: calcium hydride, barium hydride, strontium hydride, sodium hydride, and lithium aluminum hydride;

hydroxides, selected from the group consisting of: potassium hydroxide and sodium hydroxide;

metal complexes, selected from the group consisting of: aluminum acetylacetonate;

silicas, selected from the group consisting of: silica gel, kieselguhr;

zeolites;
anhydrides of single and multiple carboxylic acids, selected from the group consisting of: acetic anhydride, propionic anhydride, butyric anhydride or methyltetrahydrophthalic anhydride;
hybrid polymers used combination with catalysts;
carbodiimides;
organic absorbers selected from the group consisting of: weakly crosslinked polyacrylic acid, polyvinyl alcohol, ascorbates, glucose, gallic acid, and unsaturated fats and oils; and,
mixtures of two or more of the above substances.

2. The rolled up thin glass composite according to claim 1, wherein the at least one further layer comprises a layer of adhesive and/or a carrier material layer.

3. The rolled up thin glass composite according to claim 2, which comprises the thin glass film, a carrier material layer, and an adhesive layer between the thin glass film and the carrier material layer.

4. The rolled up thin glass composite according to claim 1;
wherein, over the entire extent of the thin glass film, an adhesive layer is present over the full area directly to the thin glass film, and a carrier material layer is present over the full area directly to the adhesive layer.

5. The rolled up thin glass composite according to claim 1, wherein the at least one further layer comprises an autoadhesive.

6. The rolled up thin glass composite according to claim 1, wherein a layer of adhesive present upon the thin glass film is a reversible layer of pressure-sensitive adhesive.

7. The rolled up thin glass composite according to claim 1, wherein the at least one further layer is a layer of adhesive comprising a repair material adapted for the repair of glass microcracks.

8. The rolled up thin glass composite according to claim 7, wherein the repair material comprises a hydrophobic silane.

9. The rolled up thin glass composite according to claim 1, wherein the at least one further layer comprises a barrier layer.

10. The rolled up thin glass composite according to claim 9, wherein there is present a metal layer or an organic coating or a sol-gel coating as a barrier layer between the thin glass film and the layer of adhesive or as a barrier layer between the carrier material layer and the layer of adhesive.

11. The rolled up thin glass composite according to claim 1, wherein the thin glass film has a thickness of 20-100 µm.

12. The rolled up thin glass composite according to claim 11, wherein the thin glass film has a thickness of 25 to 75 µm.

13. The rolled up thin glass composite according to claim 1, wherein the dessicant is selected from group consisting of:
cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, sodium sulfate, potassium carbonate, zeolites, calcium, magnesium, barium oxide, calcium oxide, magnesium oxide, sodium oxide, potassium oxide, strontium oxide, activated carbon, phosphorus pentoxide, calcium hydride, barium hydride, strontium hydride, sodium hydride, and lithium aluminum hydride, potassium hydroxide, sodium hydroxide, acetic anhydride, propionic anhydride, butyric anhydride, methyltetrahydrophthalic anhydride, and carbodiimides, and also mixtures of two or more of the above substances.

14. The rolled up thin glass composite according to claim 1, wherein the dessicant is selected from group consisting of:
barium, calcium, calcium sulfate, calcium chloride, calcium oxide, sodium sulfate, potassium carbonate, copper sulfate, magnesium perchlorate, magnesium sulfate, lithium chloride, and zeolites, and also mixtures of two or more of the above substances.

15. The rolled up thin glass composite according to claim 1, wherein the dessicant is selected from group consisting of:
calcium oxide, calcium sulfate, calcium chloride, fumed silicas, and zeolites, and also mixtures of two or more of the above substances.

16. The rolled up thin glass composite according to claim 1, wherein the dessicant is selected from group consisting of:
calcium oxide, calcium, barium, lithium chloride, and cobalt chloride.

* * * * *